(12) United States Patent
Grinberg et al.

(10) Patent No.: US 8,618,791 B2
(45) Date of Patent: Dec. 31, 2013

(54) DOUBLE-COIL INDUCTIVE PROXIMITY SENSOR APPARATUS

(75) Inventors: Anatoly Grinberg, Brighton, MA (US); Wayne R. Foster, Tyngsborough, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 535 days.

(21) Appl. No.: 12/895,065

(22) Filed: Sep. 30, 2010

(65) Prior Publication Data

US 2012/0081106 A1 Apr. 5, 2012

(51) Int. Cl.
*G01B 7/14* (2006.01)
(52) U.S. Cl.
USPC ....................................... 324/207.15

(58) Field of Classification Search
USPC .................................................... 324/207.15
See application file for complete search history.

(56) References Cited

U.S. PATENT DOCUMENTS

| 4,953,123 A * | 8/1990 | Takeuchi et al. ................. 365/66 |
| 2005/0093540 A1 * | 5/2005 | Merrick et al. ................. 324/239 |

* cited by examiner

*Primary Examiner* — Bot Ledynh
(74) *Attorney, Agent, or Firm* — Turocy & Watson, LLP; William R. Walbrun; John M. Miller

(57) ABSTRACT

Systems and/or methods are provided for a dual-channel inductive proximity sensor. The sensor can include a sensing element which includes a core having a first cavity and a second cavity, a first coil accommodated within the first cavity of the core, and a second coil housed within the second cavity of the core. Each coil can be independently driven by oscillators to generate respective magnetic fields. The magnetic fields can be monitored to determine whether detection of a target object occurs.

20 Claims, 7 Drawing Sheets

DOUBLE-COIL INDUCTIVE PROXIMITY SENSOR APPARATUS

TECHNICAL FIELD

The subject disclosure relates to inductive proximity sensors and, more particular, to double-coil inductive proximity sensors and methods thereof to achieve safety ratings applicable for safety situations.

BACKGROUND

Inductive proximity sensors can be employed to provide non-contact detection of an object or target. Such sensors can be utilized for a variety of sensing functions in connection with industrial plants and/or machinery. For instance, inductive proximity sensors can be employed in connection with material handling systems, robot systems, assembly systems and machines, etc. An inductive proximity sensor can emit an output signal when a target enters into a sensing area. Typically, the target is a metallic object such as a ferrous material (e.g., iron, steel, etc.) or other metallic materials (e.g., copper, nickel chromium, brass, aluminum, etc.).

A typical inductive proximity sensor operates by generating a magnetic field from a detection face. When a target moves into the magnetic field, eddy currents swell in the target. The eddy currents, in turn, generate a magnetic field, which interacts with the magnetic field generated by the sensor. In particular, the magnetic field generated by the eddy currents operates to dampen the magnetic field generated by the sensor. The sensor detects the dampening of the magnetic field and triggers an output signal which indicates that the target is in proximity to the sensor location.

Inductive proximity sensors, when employed in an industrial process control and automation systems, can be an integral part of the automotive industry, heavy machinery operations, mining operations, and/or other endeavors where safety and reliability are vital. Such operations employ dangerous equipment capable of causing serious injury to operators and/or other equipment if not maintained in a safe operating condition or state. The International Electrotechnical Commission (IEC), a standard organization, prepares and published international standards related to electrical and electronic technologies such as, but not limited to, power generation technology, transmission and distribution of power to home appliances and office equipment, semiconductors, fiber optics, batteries, solar energy technology, nanotechnology, marine energy technology, etc. For instance, IEC 60947-5-2 relates to proximity devices and IEC 60947-5-3 relates to proximity device with defined behavior under fault conditions. In addition, the IEC publishes safety related standards such as IEC 61508, "Functional Safety of Electrical/Electronic/Programmable Electronic Safety—Related Systems." IEC 61508 is a product-oriented functional safety standard, wherein human safety is a primary focus. The standard can provide guidance to promote protection of human life through analysis of products, machinery, and/or equipment that can endanger human safety. Moreover, the standard can facilitate minimizing risk in non-safety critical environments as well as protecting valuable machinery or equipment. In particular, IEC 61508 relates to functional safety, which is a part of overall safety that depends on a system or equipment operating correctly in response to inputs. Functional safety is achieved when all safety functions that comprise a safety system are carried and an associated performance level required for each function is met.

Equipment under control can be a set of equipment, machinery, apparatus, plants, or other devices employed for manufacturing, processes, transportation, medical operations, etc. When a foreseeable action or inaction can lead to hazardous events arising from the equipment under control, one or more safety functions can be implemented to maintain a safe state for the equipment under control. The safety functions can be included in a safety system, which includes a plurality of hardware and software components to carry out the safety functions. For a given safety function, a safety integrity level (SIL) can be determined. The SIL is a measure of safety system performance and can be based upon a probability of a failure over time of the safety function. As described in IEC 61508, there are four SIL levels: SIL 1 to SIL 4, with SIL 4 being the highest safety level. However, SIL 3 is considered the highest level of risk reduction achievable with a single programmable electronic system.

Inductive proximity sensors can be employed in safety systems as part of one or more safety functions. For example, inductive proximity sensors can be utilized to detect potentially unsafe conditions such as an object out of position, an obstruction, unsafe distances between objects, and the like. An SIL level applies to an entire safety function (e.g., all hardware and software components implementing the function), as opposed to individual components (e.g., logic controllers, sensors, final elements, field devices, etc.). However, individual components can be designated as suitable for a particular SIL level. For instance, a sensor can be designated as a SIL 3 suitable if, when employed properly, the sensor can facilitate achieving an SIL 3 rating for a safety function. Typical inductive proximity sensors employ a single coil design with a frequency-pulse-timing method. To be SIL 3 suitable, a certain level of test coverage is required. It can be cumbersome to prove testing of a single channel inductive proximity sensor which is sufficient to garner a SIL 3 rating.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

Systems and/or methods are disclosed for a dual channel inductive proximity sensor. In an aspect, the dual channel inductive proximity sensor can include multiple inductor-oscillator chains to provide reliable and redundant detection. Each inductor-oscillator chain can be coupled to a respective detector and/or microcontroller, which monitors the chain to identify whether detection of a target has occurred. The respective detectors and/or microcontrollers can also cross-monitor (e.g., monitor more than one chain) and/or exchange information with other detectors and/or microcontrollers associated with other chains.

In another aspect, a double-coil/core assembly employable in a dual channel inductive proximity sensor is provided. The double-coil/core assembly can include at least two coils accommodated within a single core. The core is configured to enable each coil to be independently coupled to a distinct oscillator. Each coil, when driven by respective oscillators, can generate a magnetic field to establish separate detection channels.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
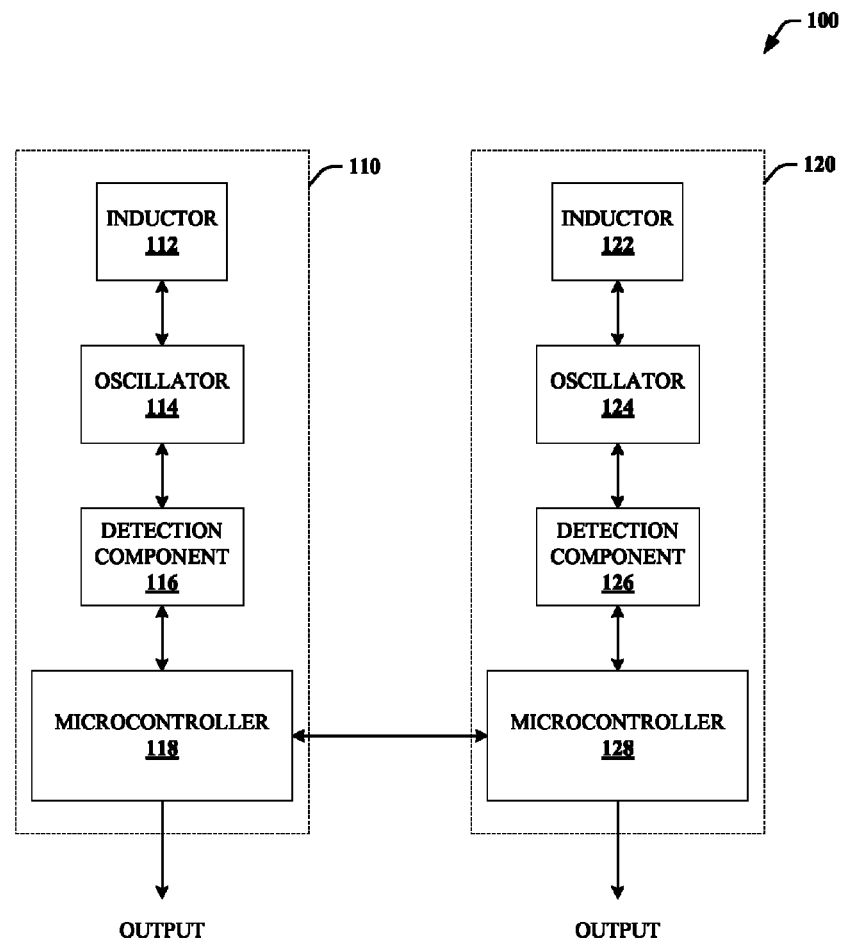
FIG. 1 illustrates a high-level block diagram of a dual-channel inductive proximity sensor in accordance with various aspects.

Systems and/or methods are presented that provide a dual-channel inductive proximity sensor with cross monitoring. The inductive proximity sensor can include a double-coil/single-core assembly, which enables redundant and independent sensing of a target material. Each coil can be independently driven by oscillators and associated with separate detection components. Such independent and redundant sensing can enable an inductive proximity sensor, employing the double-coil/single-core assembly, to achieve a high safety rating (e.g., IEC 61508 SIL 3 rating or ISO 13849 PLe rating) without requiring test coverage necessary for single channel devices.

Various embodiments are now described with reference to the drawings, wherein like reference numerals are used to refer to like elements throughout. In the following description, for purposes of explanation, numerous specific details are set forth in order to provide a thorough understanding of one or more embodiments. It will be evident, however, that such embodiment(s) can be practiced without these specific details. In other instances, well-known structures and devices are shown in block diagram form in order to facilitate describing one or more embodiments.

Referring initially to FIG. 1, illustrated is an inductive proximity sensor 100 in accordance with various aspects. Sensor 100 can include a first channel 110 and a second channel 120. Each channel can independently detect a presence of a target that enters within respective fields of detection. In addition, channels 110 and 120 can communicate to implement cross-monitoring and fault detection. Accordingly, sensor 100 provides redundant and reliable proximity detection suitable for safety systems in which a high level of risk reduction is desired.

The first channel 110 can include an inductor 112 driven by an oscillator 114. In one example, inductor 112 can include a core (e.g., ferrite core) with a coil of wire or similar conductor looped around the core. However, it is to be appreciated that inductor 112 can include any suitable inductor that can facilitate generation of a magnetic field and that the claimed subject matter is not limited to the example inductor comprised of a coil/core assembly. For instance, it is contemplated that other inductor types, such as but not limited to, an air core coil, radio frequency inductor, ferromagnetic core coil inductor, laminated core inductor, toroidal core coil, planar coil based (PCB-based coil), etc., are intended to fall within the scope of the hereto appended claims.

Oscillator 114 can generate a wave signal or output, such as a sine wave, which drives the inductor 112. The wave signal of oscillator 114 in connection with inductor 112 generates a magnetic field. The magnetic field can induce an eddy current in a target entering within the field of detection of the first channel 110. The eddy current in the target generates an opposing magnetic field which dampens the magnetic field generated by oscillator 114 and inductor 112. In particular, dampening the magnetic field dampens the wave signal output by oscillator 114, which in turn alters a voltage associated with oscillator 114.

The first channel 110 includes a detection component 116 that senses the dampening of the magnetic field due to effects of the eddy current. In particular, the detection component 116 can identify changes in the voltage of oscillator 114. In one example, detection component 116 can compare the voltage of oscillator 114 to a threshold. For instance, detection component 116 can detect whether the voltage of oscillator 114 drops below the threshold. In another example, detection component 116 can include a window comparator that identifies when an input is between an upper bound and a lower bound (e.g., the window). With a window comparator, detection component 116 can signal when the voltage drops below the upper bound, which can occur when the target enters into the field of detection. In addition, the detection component 116 can identify when voltage of oscillator 114 drops below the lower bound indicating that the target is very close to the surface of sensor 100. In this way, the lower bound can be denoted a "Too Close Margin", and the identification, by the detection component 116, of an input below the lower bound can facilitate diagnostics on sensor 100.

Detection component 116, with a threshold or a window comparator, enables reliable operation of first channel 110 of sensor 100 by ignoring false or unreliable detections. For example, other factors can generate variance in the voltage of oscillator 114. To avoid false detections, the threshold or upper bound allow for a detection to be signal when the variance is sufficiently large.

In an aspect, the threshold and/or the upper/lower bounds can be preconfigured or predetermined. For example, detection component 116 can be configured with thresholds and bounds optimized for an environment in which sensor 100 is deployed. In another example, thresholds and bounds can be configured in accordance with a desired range. For instance, thresholds and bounds associated with detection component 116 can be established such that metal or other objects mounted near sensor 100 in the environment are outside a range or otherwise ignored.

In one aspect, an output signal from detection component 116 can operate as an output signal for first channel 110. Detection component 116 can generate a detection or output signal (e.g., a signal indicating a detection) when detection component 116 identifies a dampening of the magnetic field. As discussed above, the output signal can be generated when the dampening exceeds a threshold (e.g., the magnetic field is dampened below a predetermined level), or when the dampening falls within a configured range (e.g., between upper and lower bounds of a window comparator).

According to another aspect, first channel 110 can also include a microcontroller 118. Microcontroller 118 can facilitate configuration and/or control of oscillator 114 and detection component 116. In addition, microcontroller 118 can provide formatting and/or control of output from first channel 110. For example, microcontroller 118 can generate variety of output signal types, such as but not limited to, an on/off signal (e.g., detection/no detection signal), an analog signal, a pseudo-analog signal, a packet including detailed information, etc.

In another example, microcontroller 118 can analyze the detection signal from detection component 116 and/or the voltage of oscillator 114. The analysis can be based on an instantaneous value of the detection signal or voltage, or based upon values aggregated over a time period (e.g., an analysis window). Analysis of the instantaneous value of the detection signal or voltage can include generation of an estimated distance to the target object. Microcontroller 118 can estimate the distance to the target based upon an amount of dampening indicated by the detection signal and/or voltage of oscillator 114. In addition, microcontroller 118 can account for a frequency and normal voltage output of oscillator 114 when determining the distance estimate. Analysis on aggregated values can include generation of an extended history of detections, a record of movement, over time, of the target within the field of detection.

In another aspect, second channel 120 can include an inductor 122, an oscillator 124, a detection component 126, and a microcontroller 128 which can be similar to, and provide similar functionality as, inductor 112, oscillator 114, detection component 116, and microcontroller 118 of first channel 110 described above. Second channel 120 can provide proximity detection independent of first channel 110. Accordingly, second channel 120 can operate as a redundant proximity sensor to first channel 110. For instance, second channel 120 is available for proximity detection should components of first channel 110 fail or become inoperable. Such redundancy enables sensor 100 to achieve safety ratings, such as SIL3, without extensive test data.

In another aspect, first channel 110 and second channel 120 can coordinate to provide reliable proximity detection. Microcontroller 118 and microcontroller 128 can implement cross-monitoring for sensor 100. With cross-monitoring, microcontroller 118 can monitor an output of second channel 120. Similarly, microcontroller 128 can monitor an output of first channel 110. Thusly, microcontrollers 118 and 128 can verify proper operation of first channel 110 and second channel 120 of sensor 100, and identify potential failures of either channel.

In an example, first channel 110 can detect a target within a field of detection generated by inductor 112 and oscillator 114. Microcontroller 118 can identify that second channel 120 fails to detect the same target within a respective field of detection. Accordingly, second channel 120 can have a potential failure. Sensor 100 can output a warning or failure condition to alert a safety system in which sensor 100 is incorporated. It is to be appreciated that the reverse situation can also occur, wherein microcontroller 128 identifies a potential failure in first channel 110. Moreover, microcontrollers 118 and 128 can identify potential failures within their respective channels. For instance, microcontroller 118 can observe detection by second channel 120 while first channel 110 does not register a similar detection.

In another example, cross-monitoring can facilitate reduction of false positives. One of first channel 110 or second channel 120 can detect a target while the other does not register the target. Microcontrollers 118 and 128 can exchange such information and evaluate, based upon detection signals, oscillator characteristics, inductor configuration, etc., whether or not a false positive has occurred. In addition, detection results can be verified when microcontrollers 118 and 128 exchange information indicating detections by both first channel 110 and second channel 120.

While sensor 100 is depicted as providing two output signals (e.g., one from first channel 110 and one from second channel 120), it is to be appreciated that the output signals can be independent output signals, or dependent output signals. For example, microcontrollers 118 and 128 can provide identical output signals of first channel 110 and second channel 120. The identical output signals can include detailed information regarding each channel such as, a detection indicator for first channel 110, a detection indicator for second channel 120, an estimated range to target based upon the first channel 110 and/or second channel 120, potential failure conditions, warnings, false positive indicators, etc. According to another aspect, sensor 100 can provide a single output signal that includes the detailed information and/or an on/off detection signal based upon respective outputs of first channel 110 and second channel 120. Microcontrollers 118 and 128 can jointly generate the single output signal.

In another aspect, while FIG. 1 depicts first channel 110 and second channel 120 having respective microcontrollers 118 and 128, it is to be appreciated that sensor can include only one microcontroller total and/or more than one microcontroller per channel. Moreover, a dual-channel proximity sensor, such as sensor 100, can be implemented in a variety of form factors. For example, sensor 100 can have a cylindrical housing, a block-style housing, a ring-style housing, etc. To facilitate description, aspect of the claimed subject matter is described in connected with a cylindrical proximity sensor; however, it is to be appreciated that aspects described herein can be extended and/or adapted to proximity sensors having different form factors.

Figure 2:
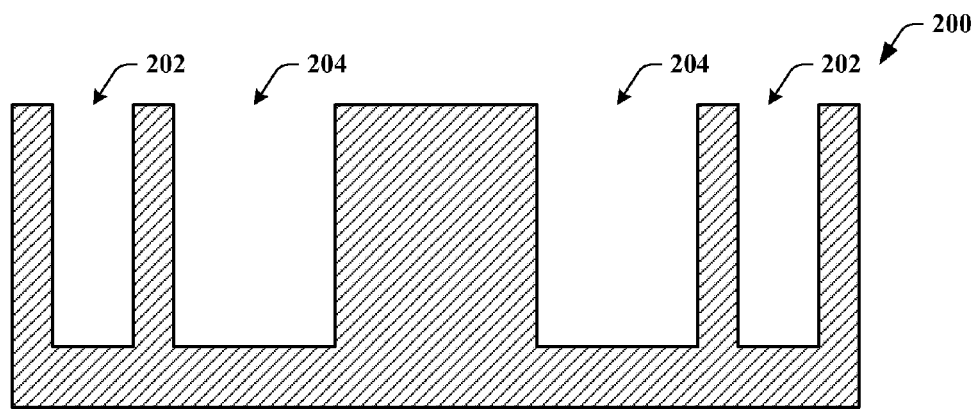
FIG. 2 depicts a cross-section of an example core structure employable in a double coil inductive proximity sensor in accordance with various aspects.

Inductors 112 and 122 of first channel 110 and second channel 120, respectively, can be implemented with a dual-coil/core assembly. Turning to FIG. 2, depicts a cross-section of an example core structure employable in a double coil inductive proximity sensor in accordance with various aspects. FIG. 2 illustrates a core 200 having a first cavity 202 and a second cavity 204. Cavities 202 and 204 can be located in a top surface of core 200. Cavities 202 and 204 can have a depth, which corresponds to a substantial portion of a height of core 200. However, it is to be appreciated that cavities 202 and 204 can have substantially any depth depending on a size of coil to be accommodated within the cavities. Moreover, respective depths of first cavity 202 and second cavity 204 can be different. In addition, respective widths of first cavity 202 and second cavity 204, as shown in the cross section of FIG.

2, can be identical or different. As will be described below, cavities 202 and 204 can incorporate respective coils which, when excited by oscillators, cooperate with core 200 to generate respective magnetic fields.

Figure 3:
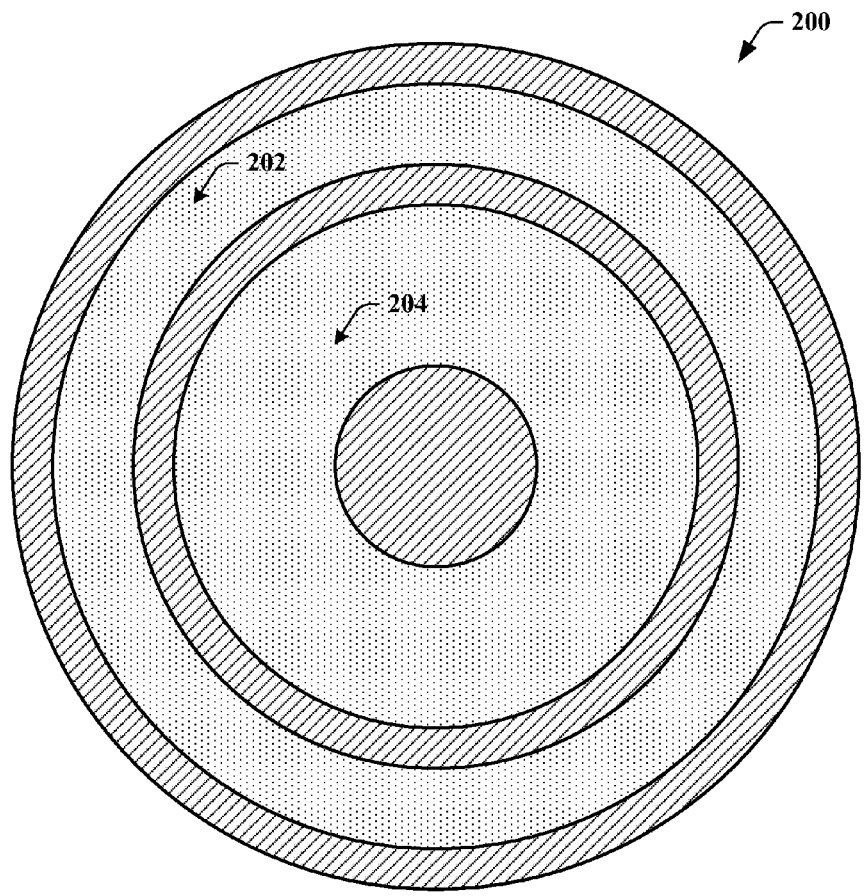
FIG. 3 illustrates a top-view diagram of an example core structure employable in a double coil inductive proximity sensor according to one or more aspects.

FIG. 3 illustrates a top-view diagram of core 200. As shown in FIG. 3, core 200 is adapted for utilization in a cylindrical type proximity sensor; however, it should be appreciated that other sensor form factors can be adapted to employ a dual-core/core assembly as described herein. Further, it is contemplated that the claimed subject matter is not limited to cylindrical-type sensors and is intended to encompass other form factors. As shown in FIG. 3, in a cylindrical-type sensor, core 200 can be circular. First cavity 202 and second cavity 204 can be ring-shaped cavities concentrically located with respect to one another.

Core 200 can composed of ferromagnetic materials (e.g., ferrites). In addition, core 200, can be iron, an iron-containing compound, nickel, cobalt, rare earth metals, and the like. However, it is to be appreciated that other materials can be employed to construct core 200 provided that such materials facilitate and/or do not hinder generation of a magnetic field.

Figure 4:
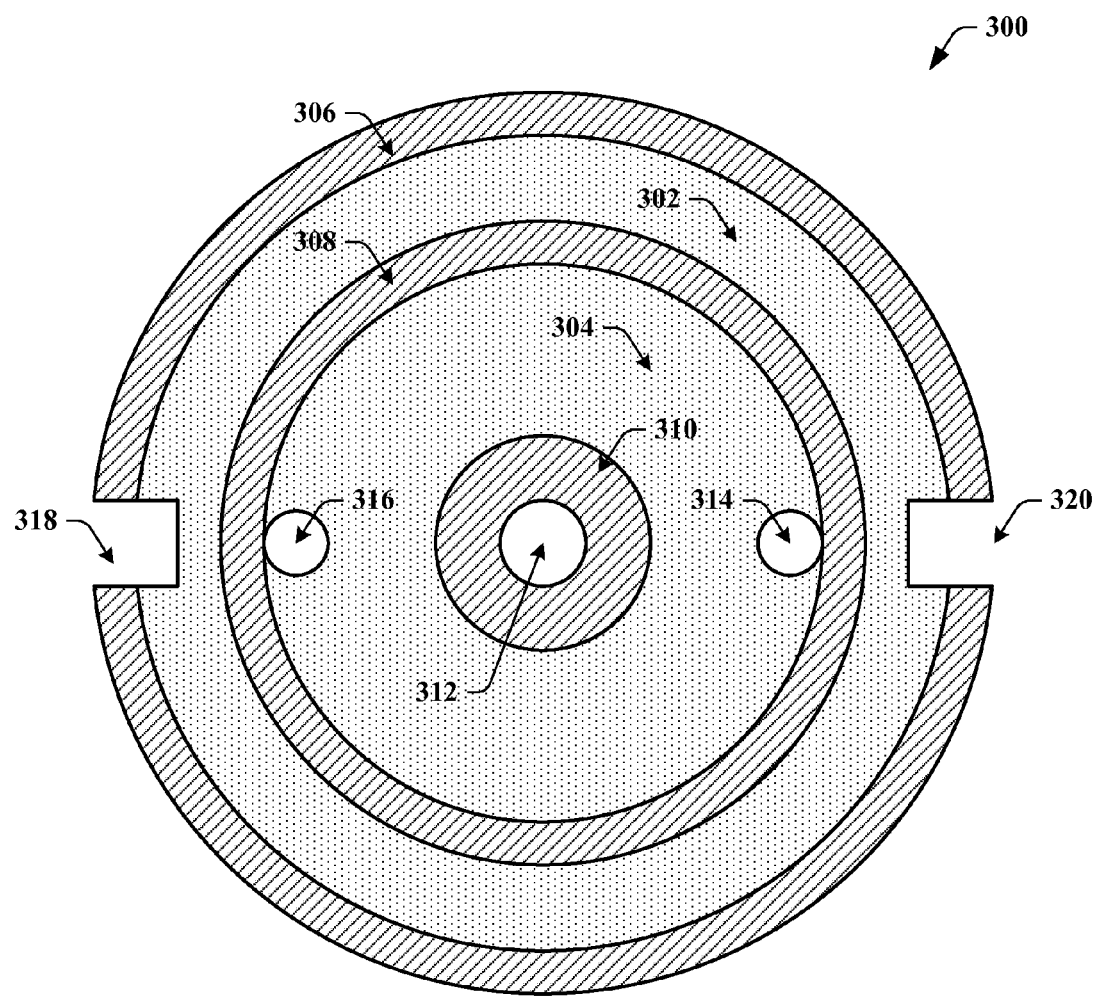
FIG. 4 is a top-view diagram of an example core adapted for utilization in a double coil inductive proximity sensor in accordance with various aspects.

Core 200 is an example core structure employable in a dual-coil inductive proximity sensor. To accommodate coils, some adaptations can be made. FIG. 4 illustrates a top-view diagram of an example core 300 adapted for utilization in a double coil inductive proximity sensor in accordance with various aspects. Core 300 includes a first cavity 302 and a second cavity 304 on a top face of core 300. First cavity 302 and second cavity 304 can hold coils which can be excited by oscillators. Cavities 302 and 304 can be concentric rings with respect to one another. With the cavities 302 and 304 formed in core 300, the core includes an outer wall portion 306. The outer wall portion 306 can extend to a full height of core 300 as depicted in FIG. 2. In addition to outer wall portion 306, core 300 includes an inner wall portion, which separates first cavity 302 and second cavity 304. In the example of a cylindrical-type sensor, inner wall portion 308 and outer wall portion 306 are concentrically located with respect to one another. A center column 310 forms the center portion of core 300. Center column 310 includes a channel 312 which extends from the top portion of core 300 through to the bottom portion of core 300. Channel 312 can be employed, for example, to mount core 300 within a larger housing comprising an inductive proximity sensor.

Second cavity 304 can include first and second openings 314 and 316, respectively, located at the bottom surface of the cavity. The first and second openings 314 and 316 enable access to a coil housed within the second cavity 304. For instance, an oscillator can interact with a coil in the second cavity 304 via connectors passing through the first and second openings 314 and 316. In addition, core 300 can include first and second notches 318 and 320, respectively, in the outer wall portion 306. The notches 318 and 320 can extend from the top portion of core 300 to the bottom portion of the core, and from the exterior surface of outer wall portion 306 to an inner surface of outer wall portion 306. In addition, the notches can extend into the bottom surface of first cavity 302 as shown in FIG. 4. The notches 318 and 320 enable access to a coil housed within the first cavity 302. Similar to openings 314 and 316, a coil within first cavity 302 can be coupled to an oscillator via connectors through notches 318 and 320.

Figure 5:
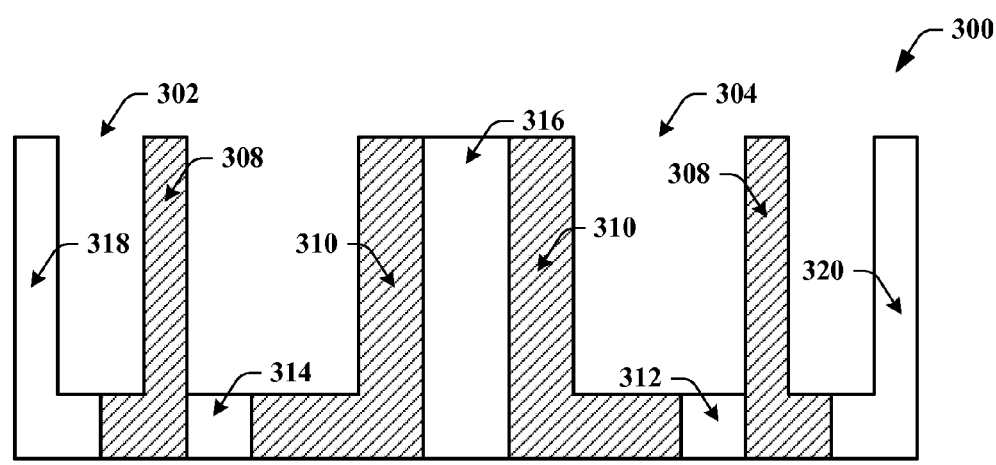
FIG. 5 is a cross-sectional diagram of an example core adapted for utilization in a double coil inductive proximity sensor according to one or more aspects.

FIG. 5 illustrates a cross-sectional diagram of core 300 adapted for utilization in a double coil inductive proximity sensor according to one or more aspects. The cross section depicted in FIG. 5 can be generated by bisecting FIG. 4 along a diameter connected notch 318 with notch 320. Accordingly, FIG. 5 illustrates gaps in outer wall portion 306 due to notches 318 and 320.

Figure 6:
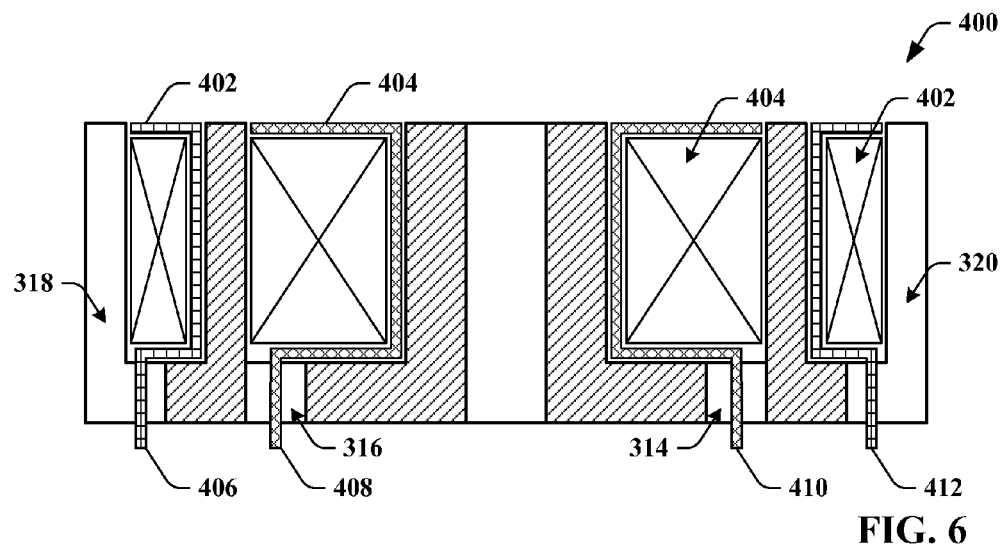
FIG. 6 illustrates a cross-sectional diagram of an example double coil and core assembly employable in a dual channel inductive proximity sensor in accordance with various aspects.
Figure 7:
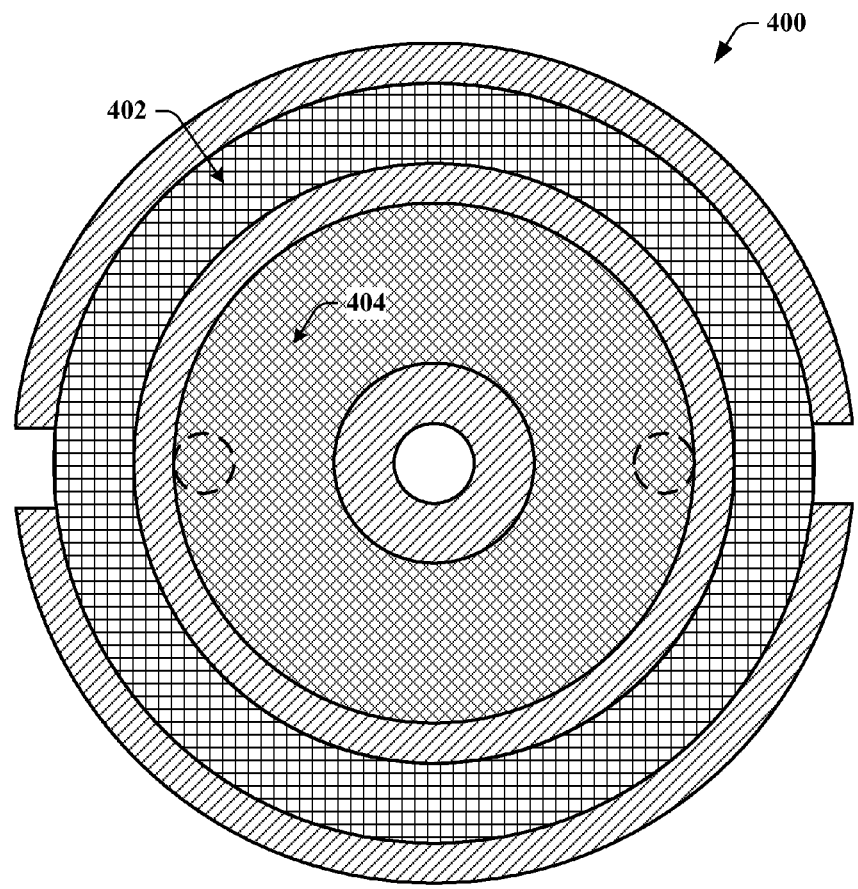
FIG. 7 illustrates a top-view diagram of an example double coil and core assembly employable in a dual channel inductive proximity sensor according to various aspects.

As described above, cavities 302 and 304 can respectively accommodate coils that facilitate generation of a magnetic field. FIG. 6 illustrates a cross-sectional diagram of an example double coil and core assembly 400. In one example, assembly 400 can be employed in a dual channel inductive proximity sensor, such as sensor 100. As shown in FIG. 6, first cavity 302 can house a first coil 402 and second cavity 304 can accommodate a second coil 404. Coils 402 and 404 can be a length of wire conductor looped around. The wire conductor can be a copper wire, for example; however, it is to be appreciated that other conductors can be utilized beyond copper and the claimed subject matter is contemplated to extend to such alternatives. In another example, coils 402 and 404 can be conductors wrapped around the inner wall portion 308 and center column 310, respectively, of the core. In yet another example, coils 402 and 404 can be constructed with bobbins inserted in cavities 302 and 304. Coil 402 can be coupled to an oscillator via first connector 406 which extends through notch 318. Coil 402 can also be coupled to the oscillator via a second connector 412 which extends through notch 320. Similarly, coil 404 can utilize the first opening 316 to expose a connector 408 and the second opening 314 to expose another connector 410. FIG. 7 illustrates a top-view diagram of an example double coil and core assembly 400 employable in a dual channel inductive proximity sensor according to various aspects. FIG. 7 depicts a top portion or surface of assembly 400 which shows top surfaces of first coil 402 and second coil 404.

The aforementioned illustrations and descriptions of a double-coil/core assembly are intended to be example implementations. It is to be appreciated that alternations and/or modifications can be applied to the examples, and that such resultant structures are contemplated to be within the purview of the attached claims. For instance, the coils 402 and 404 can have identical or varying widths, identical or varying heights, same or different thicknesses, etc. Coils 402 and 404 can be constructed from the same of different materials having identical or varying wire gauges, number of coils, levels of packing (e.g., closely packed, tightly wound, loosely packed, loosely wound, . . . ), etc. In another aspect, respective top surfaces of first coil 402, second coil 404, and core 200 need not be in alignment nor flush. For instance, top surfaces of coils 402 and 404 can be arranged in a staggered or stepped manner. Moreover, the core portion of the double-coil/core assembly can be a single construction of material or several disparate pieces which can be loosely associated, coupled together, interlocked, etc.

According to an aspect, differences in characteristics of first coil 402, second coil 404, and/or core 200, such as those described above, can be implemented to introduce diversity in an inductive proximity sensor. For example, dimensional differences between first coil 402 and second coil 404 can lead to differences in respective magnetic fields generated. In turn, magnetic field differences create variation in respective fields of detection. In addition to structural differences, diversity can be introduced via independent oscillators respectively coupled to first coil 402 and second coil 404. Each independent oscillator can drive an associated coil at a distinct frequency and/or voltage such that varying magnetic fields are generated.

Diversity, in either coil/core structure or coil operation, can improve redundancy and reliability of a corresponding inductive proximity sensor employing a double-coil/core assembly. For instance, diversity creates differences in the detection capability of individual coils, which fosters reliability and redundancy.

Figure 8:
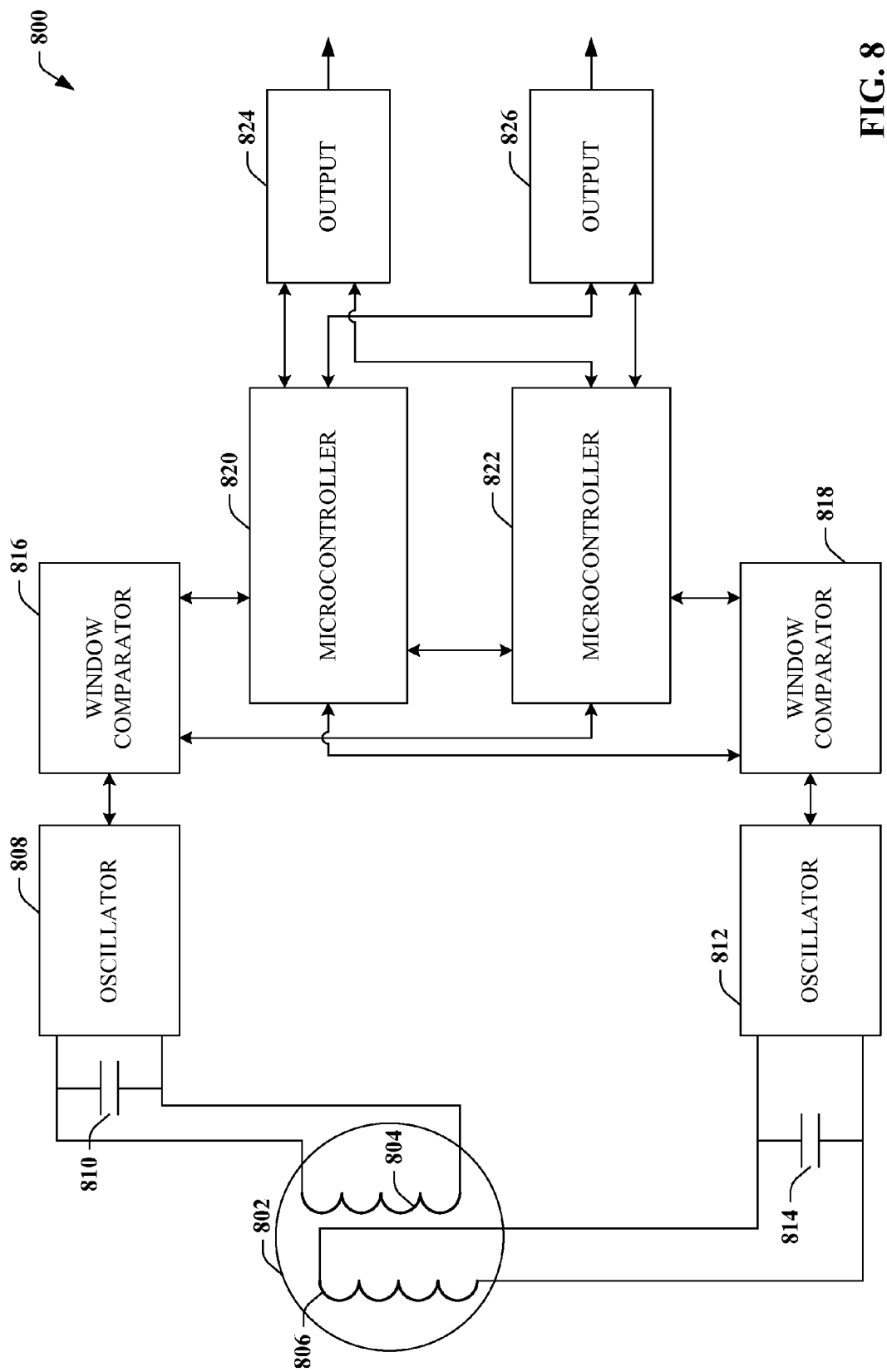
FIG. 8 illustrates a dual-channel inductive proximity sensor with a double-coil/core assembly in accordance with various aspects.

Turning to FIG. 8, an inductive proximity sensor 800 with a double-coil/core assembling is illustrated in accordance with various aspects. Sensor 100 can include a core 802 that includes two coils—namely, a first coil 804 and a second coil 806. In one example, core 802, first coil 804 and second coil 806 can be similar in structure to and/or provide similarly functionalities as coil and core assemblies described supra with respect to FIGS. 2-7.

First coil 804 can be coupled to an oscillator 808, which can drive with a wave signal having a particular frequency and amplitude, the first coil 804. In addition, a capacitor 810 can be connected in parallel with the first coil 804. Similarly, second coil 806 can be coupled to an oscillator 812, which drives, with a wave signal, the second coil 806. A capacitor 814 can be connected in parallel with second coil 806.

First coil 804 and second coil 806, when driven by respective oscillators 808 and 812, produce individuals magnetic fields. The magnetic fields can generate eddy currents in detectable objects which enter within the fields. The eddy currents have associated magnetic fields, which oppose the magnetic fields generated by the first coil 804 and second coil 806. The magnetic fields from eddy currents operate to dampen the magnetic fields of coils 804 and 806.

When dampened, respective voltages of oscillators 808 and 812 can decrease. A set of window comparators—in particular, window comparator 816 and window comparator 818—can monitor the voltage levels of oscillators 808 and 812, respectively. The window comparators 816 and 818 can identify when an input (e.g., a voltage of an oscillator) is within a predetermined window. The window can be defined by an upper bound or threshold and a lower threshold. Window comparators 816 and 818 enables proximity detections when the voltage decreases enough to indicate a high likelihood of detection (e.g., voltage drops below the upper threshold), while maintaining "Too Close Margin" detection as a diagnostic feature by identifying when the voltage drops below the lower bound.

A set of microcontrollers that includes microcontrollers 820 and 822 can interact with window comparators 816 and 818 to facilitate generation of output of sensor 800. Each of microcontrollers 820 and 822 can individually obtain comparison results from window comparators 816 and 818. Microcontrollers 820 and 822 can implement a variety of analytical techniques to identify whether or not proximity detection has occurred from first coil 804, oscillator 808, and window comparator 816, and/or second coil 806, oscillator 812, and window comparator 818. For instance, microcontrollers 820 and 822 can employ statistical techniques, heuristics, machine learning techniques, classifiers, etc. In addition, microcontrollers 820 and 822 can exchange analysis information.

Microcontrollers 820 and 822 can provide analysis results to a pair of output components 824 and 826. Each output component can generate an output signal or packet associated with one channel of sensor 800, wherein a channel can be delineated as one coil, oscillator, and comparator pathway. Each output component can obtain analysis results for a given channel from both microcontrollers 820 and 822. For example, output component 824 can receive analysis results from microcontrollers 820 and 822 in regard to a first channel (e.g., first coil 804, oscillator 808, and window comparator 816). Output component 824 can combine analysis results and/or resolve any discrepancies between analysis results from microcontrollers 820 and 822. Similarly, output computer 826 can receive analysis results from microcontrollers 820 and 822 in regard to a second channel (e.g., second coil 806, oscillator 812, and window comparator 818).

Figure 9:
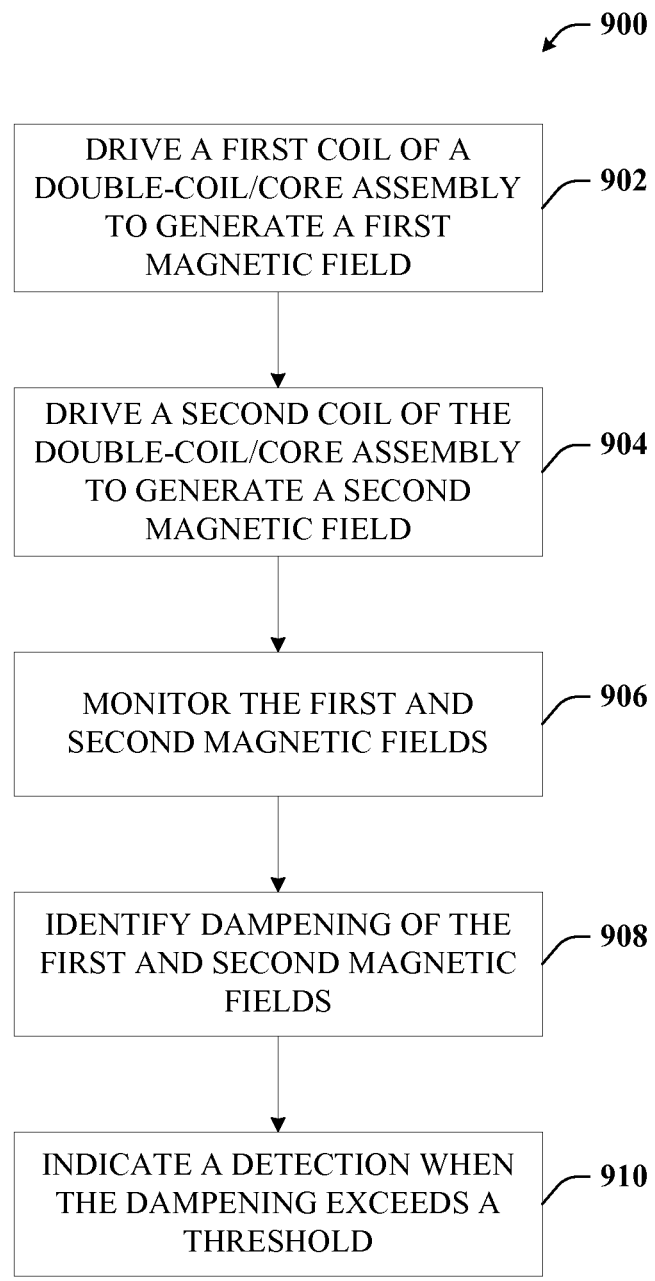
FIG. 9 is a flow diagram of an example methodology for employing a double-coil/core assembly in an inductive proximity sensor.
Figure 10:
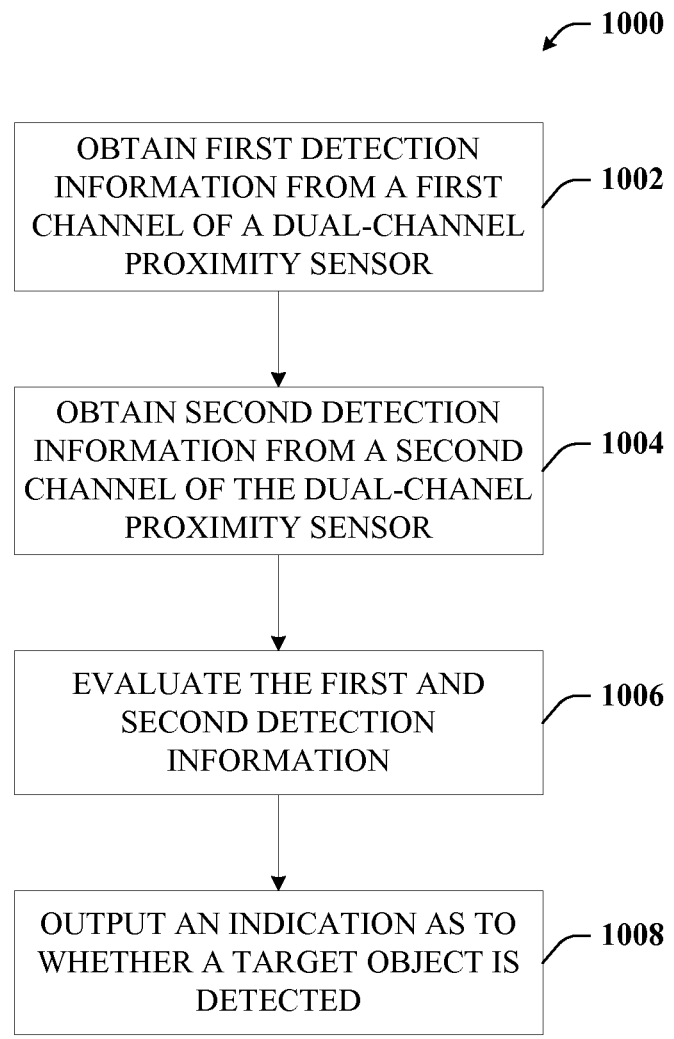
FIG. 10 is a flow diagram of an example methodology for utilizing a double-coil/core assembly in an inductive proximity sensor.

FIGS. 9-10 illustrate example methodologies for a proximity sensor dual channels and/or a double-coil structure. While, for purposes of simplicity of explanation, the processes or methodologies are shown and described as a series or number of acts, it is to be understood and appreciated that the subject processes are not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

Referring to FIG. 9, a method 900 for employing a double-coil/core assembly in an inductive proximity sensor is illustrated. At reference numeral 902, a first coil of a double-coil/core assembly is driven in to generate a first magnetic field. In an example, the first coil can be excited by a wave signal from an oscillator. At reference numeral 904, a second coil, of the double-coil/core assembly, is driven to generate a second magnetic field. In an aspect, another oscillator can drive the second coil with a wave signal. The wave signals employed to drive the first coil and second coil, respectively, can be identical wave signals. In another example, the wave signals can be distinct in order provide diversity.

At reference numeral 906, the first and second magnetic fields can be monitored. At reference numeral 908, it can be identified whether any dampening of the first and/or second magnetic fields occurs. As discussed above, the magnetic fields generated by coils of an inductive proximity sensor can create eddy currents in a detectable target that enters within the field of detection. Eddy currents, in turn, generate opposing magnetic fields which operate to dampen the magnetic fields generated by driving the first and second coils. At reference numeral 910, a detection is indicated when the dampening of the first and/or second magnetic fields exceeds a predetermined threshold.

FIG. 10 depicts a method 1000 for utilizing a dual channel proximity sensor in an inductive proximity sensor. At reference numeral 1002, first detection information is obtained from a first channel of a dual-channel proximity sensor. The first channel can include a first coil, a first oscillator, and a first detection component. The first detection information is data related to detections by the first channel. For example, the first detection information can include an indication of detection provided by the first detection component, an amount of dampening of a magnetic field generated by the first oscillator and the first coil, a voltage level of the first oscillator, an estimated distance At reference numeral 1004, second detection information is obtained from a second channel of the dual-channel proximity sensor. The second channel can comprise a second coil, a second oscillator, and a second detection component. In addition, the second detection information can include information similar to the first detection information. At reference numeral 1006, the first and second detection information is evaluated. In an example, the detection information is evaluated to determine whether the first and second channels agree (e.g., verify a detection or non-detection), whether a false positive is likely (e.g., one channel detects while another does not), and/or whether a detection failure has occurred. At reference numeral 1008, an indication is output, wherein the indication specifies whether a target object is detected.

As utilized herein, terms "component," "system," "oscillator," "detector," "microcontroller," "sensor," and the like, are intended to refer to a computer-related entity or solid-state electronic, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers. In addition, a component can be hardware or solid state electronic such as an electronic circuit, a semiconductor device, etc.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. An inductive proximity sensor, comprising:
    a first inductor coupled to a first oscillator, the first oscillator configured to excite the first inductor with a first wave signal to generate a first magnetic field;
    a second inductor coupled to a second oscillator, the second oscillator configured to drive the second inductor with a second wave signal to generate a second magnetic field;
    a core configured to house the first inductor and the second inductor; and
    a set of detection components configured to monitor the first oscillator and the second oscillator to identify whether the inductive proximity sensor detects a target object.

2. The inductive proximity sensor of claim 1, wherein the first inductor and the second inductor comprise a first coil and a second coil, respectively, wherein the first coil and the second coil comprise wound wire conductors.

3. The inductive proximity sensor of claim 1, further comprising at least one microcontroller configured to analyze respective output provided by the set of detection components.

4. The inductive proximity sensor of claim 1, wherein the set of detection components includes a first detector configured to indicate whether the target object enters within the first magnetic field and a second detector configured to indicate whether the target object enters within the second magnetic field.

5. The inductive proximity sensor of claim 1, wherein the set of detection components identify dampening of at least one of the first magnetic field or the second magnetic field.

6. The inductive proximity sensor of claim 1, wherein the set of detection components determines respective voltage levels associated with the first oscillator and the second oscillator.

7. The inductive proximity sensor of claim 6, wherein the set of detection components indicates detection of the target object when at least one voltage level of at least one of the first oscillator or the second oscillator decreases below a threshold.

8. The inductive proximity sensor of claim 6, wherein the set of detection components indicates detection of the target object when both voltage levels of the first oscillator and the second oscillator decreases below a threshold.

9. The inductive proximity sensor of claim 6, wherein the set of detection components indicates detection of the target object when at least one voltage level of at least one of the first oscillator or the second oscillator is between an upper threshold and a lower threshold.

10. The inductive proximity sensor of claim 1, wherein the first wave signal and second wave signal comprise disparate frequencies.

11. A method, comprising:
    driving a first coil of a proximity sensing device to generate a first magnetic field;
    driving a second coil of the proximity sensing device to generate a second magnetic field;
    monitoring the first magnetic field and the second magnetic field wherein the monitoring the first magnetic field and the second magnetic field comprises monitoring respective voltage levels of respective oscillators associated with the first and second coils: and
    identifying dampening of at least one of the first magnetic field or the second magnetic field.

12. The method of claim 11, further comprising indicating detection of an object when dampening exceeds a threshold.

13. The method of claim 11, further comprising indicating detection of an object when dampening of both the first magnetic field and the second magnetic field exceeds a threshold.

14. The method of claim 11, further comprising indicating detection of an object when dampening of at least one of the first magnetic field or the second magnetic field is below an upper bound and above a lower bound.

15. The method of claim 11, further comprising indicating detection, as a Too Close Margin detection, of an object when dampening of at least one of the first magnetic field or the second magnetic field is below a lower bound.

16. The method of claim 11, wherein driving the first coil comprises exciting the first coil with a first wave signal having a first frequency and driving the second coil comprises exciting the second coil with a second wave signal having a second frequency, wherein the first frequency and the second frequency are different.

17. An inductive proximity sensor, comprising:
a first inductor coupled to a first oscillator, the first oscillator configured to excite the first inductor with a first wave signal to generate a first magnetic field;
a second inductor coupled to a second oscillator, the second oscillator configured to drive the second inductor with a second wave signal to generate a second magnetic field; and
a set of detection components configured to monitor the first oscillator and the second oscillator to identify whether the inductive proximity sensor detects a target object, wherein the set of detection components determines respective voltage levels associated with the first oscillator and the second oscillator.

18. The inductive proximity sensor of claim 17, wherein the first wave signal and second wave signal comprise disparate frequencies.

19. A non-transitory computer-readable medium having instructions stored thereon that, in response to execution, cause a system including a processor to perform operations, comprising:
driving a first coil of a proximity sensing device to generate a first magnetic field;
driving a second coil of the proximity sensing device to generate a second magnetic field;
monitoring the first magnetic field and the second magnetic field, wherein the monitoring the first magnetic field and the second magnetic field comprises monitoring respective voltage levels of respective oscillators associated with the first and second coils;
identifying dampening of at least one of the first magnetic field or the second magnetic field.

20. A system, comprising:
means for driving a first coil of a proximity sensing device to generate a first magnetic field;
means for driving a second coil of the proximity sensing device to generate a second magnetic field;
means for monitoring the first magnetic field and the second magnetic field, wherein the monitoring the first magnetic field and the second magnetic field comprises monitoring respective voltage levels of respective oscillators associated with the first and second coils;
means for identifying dampening of at least one of the first magnetic field or the second magnetic field.

* * * * *